(12) United States Patent
Woerner et al.

(10) Patent No.: US 6,737,458 B2
(45) Date of Patent: May 18, 2004

(54) SILICONE COMPOSITIONS HAVING IMPROVED HEAT STABILITY

(75) Inventors: Christof Woerner, Burghausen (DE); Richard Birneder, Simbach/Inn (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 10/338,236

(22) Filed: Jan. 8, 2003

(65) Prior Publication Data

US 2003/0187131 A1 Oct. 2, 2003

(30) Foreign Application Priority Data

Mar. 28, 2002 (DE) ......................................... 102 14 137

(51) Int. Cl.$^7$ ............................................. C08G 77/08
(52) U.S. Cl. ..................... 524/251; 524/451; 524/493; 524/496; 524/588; 524/790; 524/789; 524/730; 524/731; 524/714; 524/791; 524/862; 528/15; 528/31; 528/32
(58) Field of Search ............................... 524/188, 251, 524/451, 493, 588, 790, 789, 730, 731, 714, 791, 862, 496; 528/15, 31, 32

(56) References Cited

U.S. PATENT DOCUMENTS

| | | | | |
|---|---|---|---|---|
| 3,623,942 A | * | 11/1971 | Yerrick | 428/101 |
| 4,131,588 A | | 12/1978 | Smith, Jr. | |
| 5,371,162 A | * | 12/1994 | Konings et al. | 528/15 |
| 5,424,352 A | * | 6/1995 | Watanabe | 524/433 |
| 5,691,407 A | * | 11/1997 | Azechi et al. | 524/437 |
| 5,721,300 A | * | 2/1998 | Knies et al. | 524/200 |
| 5,767,183 A | * | 6/1998 | Takei et al. | 524/430 |
| 6,239,378 B1 | * | 5/2001 | Shepard | 174/110 S |
| 2003/0105262 A1 | * | 6/2003 | Mueller et al. | 528/15 |

FOREIGN PATENT DOCUMENTS

| | | |
|---|---|---|
| EP | 0 653 463 | 5/1995 |
| EP | 0 801 103 | 4/1996 |
| EP | 0 953 675 A2 | 11/1999 |
| EP | 0 994 159 A1 | 4/2000 |
| EP | 1 006 147 A1 | 6/2000 |
| EP | 1 077 226 A1 | 2/2001 |

OTHER PUBLICATIONS

Derwent Abstract Corresponding To [AN 2000–319924] EP 994 159.
Derwent Abstract Corresponding To [AN 2000–401775] EP 1 006 147.
Derwent Abstract Corresponding To [AN 2001–283482] EP 1 077 226.
Derwent Abstract corresponding to EP 801 103 (AN 1997–491963).

* cited by examiner

*Primary Examiner*—Margaret G. Moore
(74) *Attorney, Agent, or Firm*—Brooks Kushman P.C.

(57) ABSTRACT

The invention relates to silicone compositions which can be crosslinked to give elastomers and which comprises the constituents (A) from 20 to 99% by weight of polyorganosiloxane containing at least two alkenyl groups per molecule and having a viscosity at 25° C. of from 0.1 to 500,000 Pa.s, (B) from 1 to 80% by weight of non-reinforcing filler having a mean particle size of from 0.1 to 200 μm and a specific surface area of <100 m$^2$/g, (C) a crosslinking component comprising
  (C1) an organic peroxide, or
  (C2) an organosilicon compound containing at least two SiH functions per molecule in combination with a hydrosilylation catalyst, and (D) a nitrogen compound which is selected from amino, ammonium and amido compounds and nitrogen-containing organosilicon compounds.

The compositions exhibit improved thermal stability and resistance to oil at elevated temperatures.

14 Claims, No Drawings

SILICONE COMPOSITIONS HAVING IMPROVED HEAT STABILITY

BACKGROUND OF THE INVENTION

1. Field of the Invention

The invention relates to silicone compositions which comprise inactive fillers and nitrogen compounds which can be crosslinked to provide elastomers, and to the silicone elastomers obtainable therefrom.

2. Background Art

As is known, the oil resistance of silicone elastomers can be improved by addition of, for example, quartz or talc. U.S. Pat. No. 4,131,588 describes mica- and optionally talc-containing addition- and condensation-crosslinking silicone compositions having reduced gas permeability. European published application EP-A-953675 describes the use of talc as filler in textile coating compositions. The condensation- or addition-crosslinking silicone elastomers have reduced friction owing to the talc. These compositions are principally employed in airbag coating.

However, talc and other non-reinforcing fillers cause a considerable weight loss in silicone compositions or silicone elastomers at temperatures above 100° C. It has been found, for example, that talc and quartz cleave the siloxane chain at elevated temperatures and thus catalyze the formation of cyclic, volatile siloxane compounds. This results in the heat stability of the silicone compositions and silicone elastomers being unsatisfactory at temperatures above 100° C.

SUMMARY OF THE INVENTION

An object of the present invention was to provide silicone compositions and silicone elastomers which, despite being filled with non-reinforcing fillers, have improved heat stability. This and other objects are met by peroxidically crosslinkable or addition crosslinkable silicone compositions which can be crosslinked to form elastomers, these crosslinkable compositions containing both a non-reinforcing filler and a nitrogen-containing compound.

DETAILED DESCRIPTION OF THE PREFERRED EMBODIMENT(S)

The invention thus relates more particularly to silicone compositions which can be crosslinked to give elastomers and which comprise the constituents (A) from 20 to 99% by weight of a polyorganosiloxane containing at least two alkenyl groups per molecule and having a viscosity at 25° C. of from 0.1 to 500,000 Pa.s, (B) from 1 to 80% by weight of a non-reinforcing filler having a mean particle size of from 0.1 to 200 μm and a specific surface area of <100 m²/g, (C) a crosslinking component selected from
  (C1) an organic peroxide and
  (C2) an organosilicon compound containing at least two SiH functions per molecule in combination with a hydrosilylation catalyst, and (D) a nitrogen compound which is selected from amino, ammonium and amido compounds and nitrogen-containing organosilicon compounds.

The inventors have surprisingly discovered that the addition of amino or ammonium compounds to silicone compositions which can be crosslinked to give elastomers drastically reduces cyclization and thus weight loss at elevated temperatures and therefore enables more stable mechanical properties to be achieved on exposure to heat.

The composition of the polyorganosiloxane (A) containing alkenyl groups preferably conforms to the average general formula (1)

$$R^1_x R^2_y SiO_{(4-x-y)/2} \qquad (1),$$

in which
  $R^1$ is a monovalent, optionally halogen- or cyano-substituted $C_1$–$C_{10}$-hydrocarbon radical containing aliphatic carbon—carbon multiple bonds which is optionally bonded to silicon via a divalent organic group,
  $R^2$ is a monovalent, optionally halogen- or cyano-substituted $C_1$–$C_{10}$-hydrocarbon radical containing no aliphatic carbon—carbon multiple bonds which is bonded via SiC,
  x is a non-negative number such that at least two radicals $R^1$ are present in each molecule, and
  y is a non-negative number such that (x+y) is in the range from 1.8 to 2.5.

The alkenyl groups $R^1$ are able to undergo an addition reaction with an SiH-functional crosslinking agent. Use is usually made of alkenyl groups having from 2 to 6 carbon atoms, such as vinyl, allyl, methallyl, 1-propenyl, 5-hexenyl, ethynyl, butadienyl, hexadienyl, cyclopentenyl, cyclopentadienyl or cyclohexenyl groups, preferably vinyl or allyl groups. The radicals $R^1$ can be bonded in any position of the polymer chain, in particular to the terminal silicon atoms.

Divalent organic groups via which the alkenyl groups $R^1$ can be bonded to silicon in the polymer chain consist, for example, of oxyalkylene units, such as, but not limited to, those of the general formula (2)

$$-(O)_m[(CH_2)_n O]_o- \qquad (2),$$

in which
  m has a value of 0 or 1, in particular 0,
  n has a value of 1 to 4 in particular 1 or 2, and
  o has a value of from 1 to 20, in particular from 1 to 5, including oxyalkylene moieties where the repeating methylene groups bear lower alkyl substituents. The oxyalkylene units of the general formula (2) are bonded on the left to a silicon atom.

Examples of unsubstituted radicals $R^2$ are alkyl radicals such as the methyl, ethyl, n-propyl, isopropyl, n-butyl, isobutyl, tert-butyl, n-pentyl, isopentyl, neopentyl or tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, or decyl radicals such as the n-decyl radical; alkenyl radicals such as the vinyl, allyl, n-5-hexenyl, 4-vinylcyclohexyl and 3-norbornenyl radicals; cycloalkyl radicals such as cyclopentyl, cyclohexyl, 4-ethylcyclohexyl and cycloheptyl radicals, norbornyl radicals and methylcyclohexyl radicals; aryl radicals such as the phenyl, biphenylyl and naphthyl radicals; alkaryl radicals such as o-, m- and p-tolyl radicals and ethylphenyl radicals; and aralkyl radicals such as the benzyl radical, and the alpha- and β-phenylethyl radicals.

Examples of substituted hydrocarbon radicals $R^2$ are halogenated hydrocarbons, such as the chloromethyl, 3-chloropropyl, 3-bromopropyl, 3,3,3-tri-fluoropropyl and 5,5,5,4,4,3,3-hexafluoropentyl radicals and the chlorophenyl, dichlorophenyl and trifluorotolyl radicals.

$R^2$ preferably has from 1 to 6 carbon atoms. Particular preference, is given to methyl and phenyl.

Constituent (A) may also be a mixture of polyorganosiloxanes which contain various alkenyl groups and which differ, for example, in the alkenyl group content, the nature of the alkenyl group or structurally. While it is possible for some of the molecules of constituent (A) to contain less than 2 unsaturated groups, on average, at least two of such groups should be present per molecule.

The structure of the polyorganosiloxanes (A) containing alkenyl groups can be linear, cyclic, or branched. The content of tri- and/or tetrafunctional units resulting in branched polyorganosiloxanes is typically very low, preferably at most 20 mol %, and in particular at most 0.1 mol %.

Particular preference is given to the use of polydimethylsiloxanes containing vinyl groups whose molecules conform to the general formula (3)

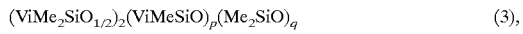
(3), where the non-negative integers p and q satisfy the following relations: $p \geqq 0$, $50<(p+q)<20,000$, preferably $200<(p+q)<1000$, and $0<(p+1)/(p+q)<0.2$.

The viscosity of the polyorganosiloxane (A) at 25° C. is preferably from 0.5 to 100,000 Pa.s, in particular from 1 to 2000 Pa.s. The silicone compositions preferably comprise from 30 to 80% by weight, more preferably from 35 to 75% by weight, of polyorganosiloxane (A), and preferably constitute neat compositions optionally containing organic solvents, but are preferably not in the form of aqueous dispersions.

Examples of the non-reinforcing filler (B) are mineral and/or organic fillers. Examples of non-reinforcing fillers (B) are quartz, for example as quartz flour, talc, diatomaceous earth, clays, chalk, lithopones, carbon blacks, graphite, metal oxides, metal carbonates, metal sulfates, metal salts of carboxylic acids, metal dusts, fibers, such as glass fibers and plastic fibers, and plastic powders. Preference is given to talc and quartz. The fillers (B) may also have been surface-modified, for example with silylating agents.

The non-reinforcing filler talc has the advantage over other inactive mineral fillers, for example, quartz, that non-abrasive, oil-resistant, crosslinkable silicone compositions can be generated. Quartz-containing silicone compositions have the disadvantage that, owing to the high abrasiveness of quartz flour, they can only be processed on machines and tools with specially hardened steel. Talc-containing, oil-resistant silicone compositions can be processed without problems on standard injection-molding machines and tools.

The mean particle size of the filler (B) is preferably from 0.5 to 100 μm, in particular from 1 to 50 μm. The specific surface area of the filler (B) is preferably <70 m²/g, more preferably <50 m²/g. The silicon compositions preferably comprise from 2 to 60% by weight, more preferably from 5 to 50% by weight, of filler (B).

The silicone compositions may comprise an organic peroxide (C1) as the crosslinking component (C). By means of the organic peroxide (C1), which serves as a source of free radicals, the silicone compositions are crosslinked by means of free radicals.

Examples of organic peroxides (C1) are acyl peroxides such as dibenzoyl peroxide, bis(4-chlorobenzoyl) peroxide, bis(2,4-dichlorobenzoyl) peroxide and bis(4-methylbenzoyl) peroxide; alkyl peroxides and aryl peroxides such as di-tert-butyl peroxide, 2,5-bis(tert-butylperoxy)-2,5-dimethylhexane, dicumyl peroxide and 1,3-bis(tert-butylperoxyisopropyl)benzene; perketals such as 1,1-bis(tert-butylperoxy)-3,3,5-trimethylcyclohexane; peresters such as diacetyl peroxydicarbonate, tert-butyl perbenzoate, tert-butyl peroxyisopropylcarbonate, tert-butyl peroxyisononanoate, dicyclohexyl peroxydicarbonate and 2,5-dimethylhexane 2,5-diperbenzoate, and tert-butyl β-hydroxyethyl peroxide. It is also possible to employ a combination of organic peroxides (C1), such as bis-4-methylbenzoyl peroxide and a single compound or at least two of the compounds from the group consisting of benzoyl peroxide, dicumyl peroxide, 2,5-dimethylhexane-2,5-diperbenzoate and di-tert-butyl peroxide.

The silicone compositions preferably comprise from 0.05 to 10% by weight, in particular from 0.1 to 2% by weight, of organic peroxide (C1).

The organosilicon compound (C2) containing at least two SiH functions per molecule preferably has a composition of the average general formula (4)

(4), in which

R³ is a monovalent, optionally halogen- or cyano-substituted $C_1$–$C_{18}$-hydrocarbon radical containing no aliphatic carbon—carbon multiple bonds, which is bonded via SiC, and a and b are non-negative integers, with the proviso that $0.5<(a+b)<3.0$ and $0<a<2$, and that at least two silicon-bonded hydrogen atoms are present on average per molecule.

Examples of R³ are the radicals indicated previously for R². R³ preferably has from 1 to 6 carbon atoms. Particular preference is given to methyl and phenyl.

Preference is given to the use of an organosilicon compound (C2) containing three or more SiH bonds per molecule. On use of an organosilicon compound (C2) having only two SiH bonds per molecule, it is advisable to use a polyorganosiloxane (A) which has at least three alkenyl groups on average per molecule.

The hydrogen content of the organosilicon compound (C2), based exclusively on the hydrogen atoms bonded directly to silicon atoms, is preferably in the range from 0.002 to 1.7% by weight of hydrogen, preferably from 0.1 to 1.7% by weight of hydrogen.

The organosilicon compound (C2) preferably contains at least three and at most 600 silicon atoms per molecule. Preference is given to the use of an organosilicon compound (C2) which contains from 4 to 200 silicon atoms per molecule. The structure of the organosilicon compound (C2) can be linear, branched, cyclic or network-like.

Particularly preferred organosilicon compounds (C2) are linear polyorganosiloxanes of the general formula (5)

(5), where

R⁴ is as defined for R³, and the non-negative integers c, d, e and f satisfy the following relations: $(c+d)=2$, $(c+e)>2$, $5<(e+f)<200$ and $1<e/(e+f)<0.1$.

The SiH-functional organosilicon compound (C2) is preferably present in the crosslinkable silicone composition in such an amount that the molar ratio of SiH groups to alkenyl groups is from 0.5 to 5, more preferably from 1.0 to 3.0.

The hydrosilylation catalyst (C2) employed can be any known catalysts which catalyze the hydrosilylation reactions that occur on crosslinking of addition-crosslinking silicone compositions. The hydrosilylation catalysts (C2) may be, for example, metals and metal compounds, in particular of metals such as rhodium, palladium, ruthenium and iridium, preferably platinum. Preference is given to the use of platinum and platinum compounds. Particular preference is given to platinum compounds which are soluble in polyorganosiloxanes. The soluble platinum compounds used can be, for example, the platinum/olefin complexes of the formulae $(PtCl_2 \cdot olefin)_2$ and $H(PtCl_3 \cdot olefin)$, preference in the latter compounds being given to the use of alkenes having from 2 to 8 carbon atoms such as ethylene, propylene, isomers of butene and octene, or cycloalkenes having from 5 to 7 carbon atoms such as cyclopentene, cyclohexene and cycloheptene. Further soluble platinum catalysts are the platinum/cyclopropane complex of the formula $(PtCl_2C_3H_6)_2$, products of the reaction of hexachloroplatinic acid with alcohols, ethers and aldehydes or mixtures thereof, or the product of the reaction of hexachloroplatinic acid with methylvinylcyclotetrasiloxane in the presence of sodium bicarbonate in ethanolic solution. Particular preference is given to complexes of platinum with vinylsiloxane, such as sym-divinyltetramethyldisiloxane. The platinum compounds described in EP-A-1077226 and EP-A-994159 are likewise very suitable.

The hydrosilylation catalyst (C2) can be employed in any desired form, including, for example, in the form of microcapsules containing hydrosilylation catalyst, or organopolysiloxane particles, as described in EP-A-1006147. The content of hydrosilylation catalysts (C2) is preferably selected in such a way that the addition-crosslinkable silicone composition has a Pt content of 0.1–200 ppm, preferably 0.5–40 ppm, when platinum catalysts are employed.

The amino or ammonium compound (D) can have any desired structure. Suitable are, for example, amino compounds (D) of the general formula (6) and ammonium compounds (D) of the general formula (7)

$$NR^5R^6R^7 \tag{6},$$

$$[NR^5R^6R^7R^8]^+X^- \tag{7},$$

in which
  $R^5$, $R^6$, $R^7$ and $R^8$ are a hydrogen atom, a hydroxyl group, a monovalent, optionally halogen- or cyano-substituted $C_1$–$C_{25}$-hydrocarbon radical, in which non-adjacent methyl groups may have been replaced by —$NR^9{}_2$ groups, methylene groups may have been replaced by —O— or —$NR^9$— groups and methylene groups may have been replaced by —N= groups, where 2 or 3 of the radicals $R^5$, $R^6$ and $R^7$ together may form an aliphatic or aromatic ring or polycyclic structure,
  $R^9$ is a hydrogen atom, a hydroxyl group or a monovalent, optionally halogen- or cyano-substituted $C_1$–$C_{10}$-hydrocarbon radical, and
  $X^-$ is selected from an OH, halogen, and acid anions.

The hydrocarbon radicals $R^5$, $R^6$, $R^7$ and $R^8$ preferably have at most 15 carbon atoms. The hydrocarbon radicals $R^9$ are more preferably aliphatic, and most preferably have 6 carbon atoms or less.

Examples of nitrogen compounds (D) in which non-adjacent methyl groups in $R^5$, $R^6$, $R^7$ and $R^8$ have been replaced by —$NR^9{}_2$ groups, methylene groups have been replaced by —$NR^9$— groups and methine groups have been replaced by —N= groups include $CH_3CH_2CH_2NHCH_2CH_2NH_2$ and $CH_3CH_2$—$CH_2N(CH_2CH_2NHCH_3)_2$. Examples where 2 or 3 of the radicals $R^5$, $R^6$ and $R^7$ together can form an aliphatic or aromatic ring or polycyclic structure are heterocyclic compounds such as morpholine, pyrimidine, pyridine and pyrrole, and derivatives thereof. Examples of acid anions X are $CO_3{}^{2-}$ and $CH_3CH_2COO^-$.

Nitrogen-containing organosilicon compounds (D) can be, for example, silanes, siloxanes and silazanes.

The nitrogen-containing silanes and siloxanes (D) preferably contain Si—C-bonded radicals of the general formula (8)

$$R^5R^6N-R^{10}- \tag{8},$$

in which
  $R^5$ and $R^6$ are as defined above, and
  $R^{10}$ is a divalent $C_1$–$C_{15}$-hydrocarbon radical, in particular an alkylene radical, preferably an alkylene radical having from 1 to 6 carbon atoms.

The structure of the polyorganosiloxanes (D) can be linear, cyclic or branched.

Examples of silanes (D) are $H_2N$—$(CH_2)_3$—$Si(OR)_3$ and $H_2N$—$(CH)_2$—$NH$—$(CH_2)_3$—$Si(OR)_3$.

Examples of siloxanes (D) are $H_2N$—$(CH_2)_3$—$Si(CH_3)_2$[—O—$Si(CH_3)_2$]$_z$—$(CH_2)_3$—$NH_2$ and $H_2N$—$(CH_2)_2$—$NH$—$(CH_2)_3$—$Si(CH_3)_2$[—O—$Si(CH_3)_2$]$_z$—$(CH_2)_3$—$NH$—$(CH_2)_2$—$NH_2$, where z can have values of from 1 to 1000. However, the amino groups may also be bonded in the middle or at the ends of the chains.

Examples of silazanes are hexamethyldisilazane and divinyltetramethyldisilazane, and derivatives thereof.

An example of an amido compound (D) is bis(trimethylsilyl)acetamide $CH_3C[=N$—$Si(CH_3)_3]OSi(CH_3)_3$ and derivatives thereof.

The nitrogen compounds (D) may optionally be those which liberate amino compounds during storage or during crosslinking or during subsequent heating of the crosslinked silicone elastomers.

Preference is given to low-volatility basic amino compounds having a boiling point above 100° C., particularly preferably above 150° C., preferably the aminoalkyl-functionalized siloxanes and silanes described above.

The N content introduced into the silicone compositions via the nitrogen compounds (D) is 10 to 10,000 ppm, preferably 15 to 1000 ppm, more preferably 15 to 500 ppm, in each case based on the sum of constituents (A) and (B).

The mechanical strength of the vulcanized silicone rubber is increased if the silicone compositions comprise actively reinforcing fillers as constituent (E). The actively reinforcing fillers (E) used are especially precipitated silicic acids and more preferably, pyrogenic silicic acids, and mixtures thereof. The specific surface area of these actively reinforcing fillers should be at least 50 m$^2$/g, and/or preferably in the range from 200 to 400 m$^2$/g, as determined by the BET method. Actively reinforcing fillers of this type are very well-known materials in the area of silicone rubbers. The content of actively reinforcing filler (E) in the addition-crosslinkable silicone compositions is preferably in the range from 5 to 60% by weight, more preferably from 10 to 40% by weight.

The crosslinkable silicone compositions may optionally comprise, as constituent (F), further additives in a proportion of up to 70% by weight, preferably from 0.0001 to 40% by weight. These additives can be, for example, resin-like polyorganosiloxanes which are different from the diorganopolysiloxanes (A) and (C2), dispersion aids, solvents, adhesion promoters, pigments, dyes, plasticizers, organic polymers, heat stabilizers, etc. These include additives such as dyes, pigments, etc. Furthermore, thixotropic constituents, such as highly disperse silicic acid or other commercially available thixotropic additives, may be present as constituent (F). In addition, siloxanes of the formula $HSi(CH_3)_2$—[O—$Si(CH_3)_2$]$_w$—H, where w has a value of from 1 to 1000, may also be present as chain extenders.

It is furthermore possible for additives (F) to be present, which serve to set the processing time, initiation temperature and crosslinking rate of the crosslinking compositions in a specific manner. These inhibitors and stabilizers are very well known in the area of crosslinking compositions. Additives which improve the compression set may also be added. In addition, hollow bodies, blowing agents for the production of foams, and/or non-vinyl-functionalized polydiorganosiloxanes may also be added.

The compounding of the crosslinkable silicone compositions is carried out by mixing the above-mentioned components in any desired sequence. The crosslinking of the crosslinkable silicone compositions is preferably carried out by warming, preferably at from 30 to 250° C., preferably at at least 50° C., more preferably at at least 100° C., preferably at a maximum of 200° C., more preferably at a maximum of 180° C.

The invention also relates to the silicone elastomers which are obtainable by crosslinking the crosslinkable silicone compositions, and to the use of a nitrogen compound (D) selected from amino, ammonium and amido compounds and nitrogen-containing organosilicon compounds for improving the heat stability of elastomers obtained by crosslinking silicone compositions which comprise the constituents:

(A) from 20 to 99% by weight of a polyorganosiloxane containing at least two alkenyl groups per molecule and having a viscosity at 25° C. of from 0.1 to 500,000 Pa.s, (B) from 1 to 80% by weight of a non-reinforcing filler having a mean particle size of from 0.1 to 200 $\mu$m and a specific surface area of <100 m$^2$/g, (C) a crosslinking component selected from
  (C1) an organic peroxide and
  (C2) an organosilicon compound containing at least two SiH functions per molecule in combination with a hydrosilylation catalyst.

The definitions of all the above symbols in the above formulae are each independent of one another. In all formulae, the silicon atom is tetravalent.

In the following examples, unless stated otherwise, all amounts and percent data are based on the weight, all pressures are 0.10 MPa (abs.) and all temperatures are 20° C.

EXAMPLES

Comparative Example C1
(not According to the Invention)

550 g of a vinyldimethylsiloxy-terminated polydimethylsiloxane having a viscosity of 20,000 mPa.s (25° C.) were mixed with 0.40 g of ethynylcyclohexanol, 12.7 g of a copolymer comprising dimethylsiloxy, methylhydrosiloxy and trimethylsiloxy units and having a viscosity of 300 mPa.s at 25° C. and an SiH content of 0.48%, and a solution comprising 0.48 g of a platinum/sym-divinyltetramethyldisiloxane complex and comprising 1% by weight of Pt. This addition-crosslinking silicone composition was subsequently crosslinked in a hydraulic press at a temperature of 165° C. for 5 minutes to give a silicone elastomer sheet having a thickness of about 2 mm.

Comparative Example C2
(not According to the Invention)

165 g of talc DAB 7 (Amberger Kaolinwerke) having a mean particle size of 10 $\mu$m and a moisture content of 0.3% were stirred into 385 g of a vinyldimethylsiloxy-terminated polydimethylsiloxane having a viscosity of 20,000 mPa.s (25° C.) and mixed with 0.40 g of ethynylcyclohexanol, 12.7 g of a copolymer comprising dimethylsiloxy, methylhydrosiloxy and trimethylsiloxy units and having a viscosity of 300 mPa.s at 25° C. and an SiH content of 0.48%, and a solution comprising 0.48 g of a platinum/sym-divinyltetramethyldisiloxane complex and comprising 1% by weight of Pt. This addition-crosslinking silicone composition was crosslinked as described in Example 1 to give a silicone elastomer sheet.

Comparative Example C3
(not According to the Invention)

The talc DAB 7 used in Comparative Example C2 was replaced by talc HB-M 15 from Chemie Mineralien GmbH having a mean particle size of 4.5 $\mu$m and a moisture content of 0.1%.

Comparative Example C4
(not According to the Invention)

The talc DAB 7 used in Comparative Example C2 was replaced by talc HB-M 45 from Chemie Mineralien GmbH having a mean particle size of 12 $\mu$m and a moisture content of 0.1%.

Comparative Example C5
(not According to the Invention)

The talc DAB 7 used in Comparative Example 2 was replaced by a hydrophobic pyrogenic silicic acid having a BET surface area of 300 m$^2$/g and a carbon content of 4.2% by weight.

Comparative Example C6
(not According to the Invention)

1.9 g of 2,5-bis(tert-butylperoxo)-2,5-dimethylhexane were incorporated into 550 g of a vinyldimethylsiloxy-terminated polydimethylsiloxane which has a Brabender plasticity of 630 daNm, and this mixture was crosslinked at 165° C. for 15 minutes to give a silicone elastomer sheet having a thickness of about 2 mm.

Comparative Example C7
(not According to the Invention)

165 g of talc HB-M 45 from Chemie Mineralien GmbH having a mean particle size of 12 $\mu$m and a moisture content of 0.1% and 1.9 g of 2,5-bis(tert-butylperoxo)2,5-dimethylhexane were incorporated into 385 g of vinyldimethylsiloxy-terminated polydimethylsiloxane having a Brabender plasticity of 630 daNm in a roll mill. The crosslinking was carried out at 165° C. for 15 minutes.

Comparative Example C8
(not According to the Invention)

The talc used in Comparative Example C7 was replaced by a hydrophobic pyrogenic silicic acid having a BET specific surface area of 300 m$^2$/g and a carbon content of 4.2% by weight.

TABLE 1

Effect of talc on the weight loss and formation of cyclic siloxane compounds in silicone elastomers at 200° C.

| Example | Filler | Weight loss of the silicone elastomers over 24 hours at 200° C. [% by wt.] | Formation of volatile cyclic siloxane compounds over 24 h at 200° C. [% by wt.] |
|---------|--------|-----|-----|
| C1 | none | 0.6 | <0.5 |
| C2 | talc DAB 7 | 5.2 | 4.7 |
| C3 | talc HB-M 15 | 4.7 | 4.3 |
| C4 | talc HB-M 45 | 4.8 | 4.3 |
| C5 | pyrogenic, hydrophobic silicic acid | 1.2 | <0.5 |
| C6 | none | 0.8 | <0.5 |
| C7 | talc HB-M 45 | 5.0 | 4.3 |
| C8 | pyrogenic, hydrophobic silicic acid | 1.3 | <0.5 |

It can be seen from Table 1 that different talc grades are responsible for the formation of cyclic siloxane compounds at elevated temperatures. All examples are comparative examples, not according to the invention.

Example 9

165 g of talc HB-M 45 were stirred into 385 g of a vinyldimethylsiloxy-terminated polydimethylsiloxane having a viscosity of 20,000 mPa.s (25° C.) and mixed with 0.28 g of hexamethyldisilazane, 0.40 g of ethynyl-cyclohexanol, 12.7 g of a copolymer comprising dimethylsiloxy, methylhydrosiloxy and trimethylsiloxy units and having a viscosity of 300 mPa.s at 25° C. and an SiH content of 0.48%, and a solution comprising 0.48 g of a platinum/sym-divinyltetramethyldisiloxane complex and comprising 1% by weight of Pt. This addition-crosslinking silicone composition was crosslinked as described in Example 1 to give a silicone elastomer sheet.

Example 10

0.56 g of trioctylamine was added to the mixture described in Comparative Example C4.

Example 11

0.17 g of ammonium chloride was added to the mixture described in Comparative Example C4.

Example 12

0.56 g of an aqueous ammonia solution (25%) was added to the mixture described in Comparative Example C4.

Example 13

0.56 g of bis(trimethylsilyl)acetamide was added to the mixture described in Comparative Example C4.

Example 14

0.56 g of ammonium carbonate was added to the mixture described in Comparative Example C4.

Example 15

1.1 g of aminopropyl-terminated polydimethylsiloxane having a viscosity of 300 mm$^2$/s were added to the mixture described in Comparative Example C4.

Example 16

1.1 g of aminopropyl-terminated polydimethylsiloxane having a viscosity of 300 mm$^2$/s were added to the mixture described in Comparative Example C7, and this mixture was subsequently crosslinked as described in Comparative Example C6.

Comparative Example C17
(not According to the Invention)

0.56 g of magnesium oxide was added to the mixture described in Comparative Example C4.

Comparative Example C18
(not According to the Invention)

0.56 g of calcium oxide was added to the mixture described in Comparative Example C4.

Comparative Example C19
(not According to the Invention)

1.1 g of magnesium silicate were added to the mixture described in Comparative Example C4.

Comparative Example C20
(not According to the Invention)

1.1 g of calcium silicate were added to the mixture described in Comparative Example C4.

TABLE 2

Effect of various additives on the weight loss and the formation of cyclic siloxane compounds in talc-containing silicone elastomers at 200° C.

| Example | Additive | Weight loss of the silicone elastomers over 24 hours at 200° C. [% by wt.] | Formation of volatile cyclic siloxane compounds over 24 h at 200° C. [% by wt.] |
| --- | --- | --- | --- |
| 4 | none | 4.8 | 4.3 |
| 9 | hexamethyldisilazane | 0.7 | <0.5 |
| 10 | trioctylamine | 0.8 | <0.5 |
| 11 | ammonium chloride | 2.3 | 1.9 |
| 12 | ammonia | 1.2 | 0.8 |
| 13 | bis(trimethylsilyl)acetamide | 0.8 | <0.5 |
| 14 | ammonium carbonate | 0.9 | <0.5 |
| 15 | aminopropyl-terminated polydimethylsiloxane | 0.6 | <0.5 |
| 16 | aminopropyl-terminated polydimethylsiloxane | 0.8 | <0.5 |
| C17 | magnesium oxide | 7.0 | 6.5 |
| C18 | calcium oxide | 4.8 | 4.2 |
| C19 | magnesium silicate | 4.7 | 4.5 |
| C20 | calcium silicate | 4.8 | 4.5 |

It can be seen from Table 2 that the addition of various nitrogen-containing additives to talc-containing silicone elastomers hinders the formation of cyclic siloxane compounds at 200° C.

Comparative Example C21 (not According to the Invention)

156 g of a vinyldimethylsiloxy-terminated polydimethylsiloxane having a viscosity of 20,000 mPa.s (25° C.) were introduced into a laboratory compounder and heated to 150° C., and 110 g of hydrophobic pyrogenic silicic acid having a BET specific surface area 300 m²/g and a carbon content of 4.2% by weight were added. This highly viscous composition was subsequently diluted with 141 g of the above-mentioned polydimethylsiloxane. Volatile constituents were removed by compounding under reduced pressure (10 mbar) at 150° C. for one hour. After cooling to room temperature, 143 g of talc HB-M 45 were added. The crosslinking of the composition described was carried out after addition of the composition described was carried out after addition of the amounts of ethynylcyclohexanol, SiH crosslinking agent and Pt catalyst described in Example 1.

Example 22

In contrast to Example 21, 0.28 g of the aminopropyl-terminated polydimethylsiloxane described in Example 15 was added to the composition described in Example 21, and the composition was subsequently crosslinked as described in Example 1.

Example 23

In contrast to Example 22, 0.56 g of the aminopropyl-terminated polydimethylsiloxane described in Example 15 was added.

Example 24

In contrast to Example 22, 2.8 g of the aminopropyl-terminated polydimethylsiloxane described in Example 15 were added.

TABLE 3

Influence of aminopropyl-terminated polydimethylsiloxane on the weight loss, formation of cyclic siloxane compounds and increase in hardness of talc-containing silicone elastomers at 200° C.

| Example | Content of aminopropyl-terminated polydimethylsiloxane [% by wt.] | Weight loss of the silicone elastomers over 24 hours at 200° C. [% by wt.] | Formation of volatile cyclic siloxane compounds over 24 h at 200° C. [% by wt.] | Increase in hardness of the silicone elastomer sheet over 14 days at 200° C. [Δ Shore A] |
| --- | --- | --- | --- | --- |
| C21 | 0 | 4.2 | 3.6 | 14 |
| 22 | 0.05 | 1.7 | 0.9 | 10 |
| 23 | 0.10 | 1.1 | <0.5 | 6 |
| 24 | 0.50 | 1.1 | <0.5 | 6 |

It can be seen from Table 3 that the addition of aminopropyl-terminated polydimethylsiloxane to talc-containing silicone elastomers reduces or prevents the formation of cyclic siloxane compounds at 200° C. and thus significantly reduces the increase in hardness.

Comparative Example C25 (not According to the Invention)

In contrast to Example 21, a vinyldimethylsiloxy- and trimethylsiloxy-functionalized pyrogenic silicic acid was used. In addition, 24.0 g of the SiH crosslinking agent described in Comparative Example C1 were added to the composition. 2.8 g of calcium hydroxide were incorporated as a further constituent in a roll mill to the composition to be crosslinked. The composition was crosslinked as described in Comparative Example C1.

Example 26

In contrast to Example 25, 0.56 g of the aminopropyl-terminated polydimethylsiloxane described in Example 15 was added.

TABLE 4

Influence of aminopropyl-terminated polydimethylsiloxane on the oil resistance.

|  | Example C25 | Example 26 |
|---|---|---|
| Content of aminopropyl-terminated polydimethylsiloxane [% by wt.] | 0 | 0.1 |
| Hardness [Shore A] | 69 | 69 |
| Tear strength [N/mm$^2$] | 6.6 | 6.7 |
| Elongation at break [%] | 340 | 335 |
| After oil storage 70 h/150° C. IRM 903 |  |  |
| Hardness [Shore A] | 62 | 64 |
| Tear strength [N/mm$^2$] | 4.4 | 5.7 |
| Elongation at break [%] | 250 | 255 |
| Increase in weight [% by wt.] | 22 | 20 |
| Increase in volume [% by vol.] | 32 | 28 |

It can be seen from Table 4 that the addition of aminopropyl-terminated polydimethylsiloxane to talc-containing silicone elastomers improves the oil resistance at 150° C.

Comparative Example C27
(not According to the Invention)

The talc DAB 7 used in Example 2 was replaced by Sikron SF 600 quartz flour from Quarzwerke GmbH. This addition-crosslinking silicone composition was crosslinked as described in Example 1 to give a silicone elastomer sheet.

Example 28

0.56 g of the aminopropyl-terminated polydimethylsiloxane described in Example 15 was added to the composition described in Example 27. This addition-crosslinking silicone composition was crosslinked as described in Example 1 to give a silicone elastomer sheet.

Comparative Example C29
(not According to the Invention)

The talc DAB 7 used in Example 2 was replaced by silane-treated Silbond 600 TST quartz flour from Quarzwerke GmbH. This addition-crosslinking silicone composition was crosslinked as described in Example 1 to give a silicone elastomer sheet.

Example 30

0.56 g of the aminopropyl-terminated polydimethylsiloxane described in Example 15 was added to the composition described in Example 29. This addition-crosslinking silicone composition was crosslinked as described in Example 1 to give a silicone elastomer sheet.

TABLE 5

Influence of aminopropyl-terminated polydimethylsiloxane on the weight loss of quartz-containing silicone elastomers at 200° C.

| Example | Content of aminopropyl-terminated polydimethylsiloxane [% by weight] | Weight loss of the silicone elastomers over 70 hours at 200° C. [% by weight] |
|---|---|---|
| C27 | 0 | 4.1 |
| 28 | 0.1 | 1.6 |
| C29 | 0 | 4.5 |
| 30 | 0.1 | 1.8 |

It can be seen from Table 5 that the addition of aminopropyl-terminated polydimethylsiloxane to quartz-containing silicone elastomers significantly decreases the weight loss.

The silicone elastomer properties were characterized in accordance with DIN 53505 (Shore A), DIN 53504-S1 (tear strength and elongation at break). The oil resistance was compared using the increase in weight and volume (in IRM903 oil (engine oil in accordance with ASTM3), which is the most aggressive).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" mean "one or more" unless indicated otherwise.

What is claimed is:

1. A silicone composition which can be crosslinked to an elastomer comprising:
   (A) from 20 to 99% by weight of a polyorganosiloxane containing at least two alkenyl groups per molecule and having a viscosity at 25° C. of from 0.1 to 500,000 Pa.s,
   (B) from 1 to 80% by weight of a non-reinforcing talc filler having a mean particle size of from 0.1 to 200 μm and a specific surface area of <100 m$^2$/g,
   (C) a crosslinking component comprising
      (C1) an organic peroxide, or
      (C2) an organosilicon compound containing at least two SiH functions per molecule in combination with a hydrosilylation catalyst, and
   (D) a nitrogen compound which is selected from the group consisting of amino, ammonium and amido compounds and nitrogen-containing organosilicon compounds,
   wherein said percentages by weight are based on the total weight of said silicone composition.

2. The silicone composition of claim 1, wherein the polyorganosiloxane (A) containing alkenyl groups has on average the formula (1)

$$R^1{}_xR^2{}_ySiO_{(4-x-y)/2} \qquad (1),$$

in which
   $R^1$ is a monovalent, optionally halogen- or cyano-substituted $C_1$–$C_{10}$-hydrocarbon radical containing aliphatic carbon—carbon multiple bonds which is optionally bonded to silicon via a divalent organic group,
   $R^2$ is a monovalent, optionally halogen- or cyano-substituted $C_1$–$C_{10}$-hydrocarbon radical containing no aliphatic carbon—carbon multiple bonds which is bonded via SiC, x is a non-negative number such that on average at least two radicals $R^1$ are present in each molecule, and y is a non-negative number such that (x+y) is in the range from 1.8 to 2.5.

3. An addition-crosslinking silicone composition of claim 1, wherein the organosilicon compound (C2) containing at least two SiH functions per molecule is present and has on average the formula (4)

$$H_a R^3_b SiO_{(4-a-b)/2} \qquad (4),$$

in which $R^3$ is a monovalent, optionally halogen- or cyano-substituted $C_1$-$C_{18}$-hydrocarbon radical containing no aliphatic carbon—carbon multiple bonds, bonded via SIC, and a and b are non-negative integers, with the proviso that $0.5<(a+b)<3.0$ and $0<a<2$, and that at least two silicon-bonded hydrogen atoms on average are present per molecule.

4. The silicone composition of claim 1, wherein the nitrogen compound (D) is selected from nitrogen-containing silanes, siloxanes and silazanes.

5. A silicone elastomer obtained by crosslinking the silicone composition of claim 1.

6. A silicone elastomer obtained by crosslinking the silicone composition of claim 2.

7. A silicone elastomer obtained by crosslinking the silicone composition of claim 2.

8. A silicone elastomer obtained by crosslinking the silicone composition of claim 3.

9. A silicone elastomer obtained by crosslinking the silicone composition of claim 4.

10. A process for improving the heat stability of elastomers obtained by crosslinking silicone compositions comprising adding to a crosslinkable composition comprising (A) from 20 to 99% by weight of a polyorganosiloxane containing at least two alkenyl groups per molecule and having a viscosity at 25° C. of from 0.1 to 500,000 Pa.s, (B) from 1 to 80% by weight of a non-reinforcing talc filler having a mean particle size of from 0.1 to 200 μm and a specific surface area of <100 m²/g, (C) a crosslinking component comprising
(C1) an organic peroxide, or
(C2) an organosilicon compound containing at least two SiH functions per molecule in combination with a hydrosilylation catalyst, a nitrogen compound (D) which is selected from the group consisting of amino, ammonium and amido compounds and nitrogen-containing organosilicon compounds, wherein said percentages by weight are based on the total weight of said silicone composition.

11. A silicone composition which can be crosslinked to an elastomer comprising:

(A) from 20 to 99% by weight of a polyorganosiloxane containing at least two alkenyl groups per molecule and having a viscosity at 25° C. of from 0.1 to 500,000 Pa.s, (B) from 1 to 80% by weight of a non-reinforcing filler having a mean particle size of from 0.1 to 200 μm and a specific surface area of <100 m²/g (C) a crosslinking component comprising
(C1) an organic peroxide, or
(C2) an organosilicon compound containing at least two SiH functions per molecule in combination with a hydrosilylation catalyst, and (D) a nitrogen compound selected from the group consisting of
(D1) amino compounds of the formula $NR^5 R^6 R^7$;

(D2) ammonium compounds of the formula $[NR^5 R^6 R_7 R^8]^+ H^-$;

(D3) a silane, siloxane or polysiloxane bearing at least one Si—C-bonded radical of the formula $R^5 R^6 N—R^{10}—$;

(D4) a silane, siloxane, or polysiloxane bearing at least one amido group;

and mixtures thereof, wherein $R^5$, $R^6$, $R^7$ and $R^8$ are independently a hydrogen atom, a hydroxyl group, a monovalent, optionally halogen- or cyano-substituted $C_1$–$C_{25}$-hydrocarbon radical, in which non-adjacent methyl groups are optionally replaced by —$NR^9_2$ groups, methylene groups are optionally replaced by —O— or —$NR^9$— groups, and methine groups are optionally replaced by —N= groups, where 2 or 3 of the radicals $R^5$, $R^6$ and $R^7$ together may form an aliphatic or aromatic ring or polycyclic structure, $R^9$ is a hydrogen atom, a hydroxyl group or a monovalent, optionally halogen- or cyano substituted $C_1$–$C_{10}$-hydrocarbon radical, $R^{10}$ is a divalent $C_1$–$C_{15}$-hydrocarbon radical, and X is OH, halogen, $CO^{2-}_3$ or $CH_3CH_2COO^-$, wherein said percentages by weight are based on the total weight of said silicone composition.

12. The silicone composition of claim 11, where D is selected from the group consisting of D1, D2, and mixtures thereof.

13. The silicone composition of claim 11, further comprising a silazane.

14. A silicone composition which can be crosslinked to an elastomer comprising:

(A) from 20 to 99% by weight of a polyorganosiloxane containing at least two alkenyl groups per molecule and having a viscosity at 25° C. of from 0.1 to 500,000 Pa.s.

(B) from 1 to 80% by weight of a non-reinforcing filler having a mean particle size of from 0.1 to 200 μm and a specific surface area of <100 m²/g, (C) a crosslinking component comprising
(C1) an organic peroxide, or
(C2) an organosilicon compound containing at least two SiH functions per molecule in combination with a hydrosilylation catalyst, and (D) a nitrogen compound selected from the group consisting of
trioctylamine, ammonium chloride, ammonia, ammonium carbonate, aminopropyl-terminated polydimethylsiloxane, and mixtures thereof wherein said percentages by weight are based on the total weight of said silicone composition.

* * * * *

Disclaimer

6,737,458 B2 — Wörner et al., Burghausen (DE). SILICONE COMPOSITIONS HAVING IMPROVED HEAT STABILITY. Patent dated May 18, 2004, Disclaimer filed Sep. 1, 2004, by the Assignee, Wacker-Chemie GmbH.

Hereby disclaims claim 7 of said patent.

*(Official Gazette June 14, 2005)*